(12) United States Patent
Kawashima et al.

(10) Patent No.: US 8,893,039 B2
(45) Date of Patent: Nov. 18, 2014

(54) APPARATUS AND METHOD FOR AUTOMATIC FOCUS SHIFT

(75) Inventors: Takashi Kawashima, Osaka (JP); Jun Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1003 days.

(21) Appl. No.: 12/526,580

(22) PCT Filed: Dec. 5, 2008

(86) PCT No.: PCT/JP2008/003627
§ 371 (c)(1),
(2), (4) Date: Aug. 10, 2009

(87) PCT Pub. No.: WO2009/075083
PCT Pub. Date: Jun. 18, 2009

(65) Prior Publication Data
US 2010/0077346 A1      Mar. 25, 2010

(30) Foreign Application Priority Data

Dec. 11, 2007   (JP) .................................. 2007-319165

(51) Int. Cl.
G06F 3/048      (2013.01)
G06F 9/44       (2006.01)
G06F 3/0481     (2013.01)

(52) U.S. Cl.
CPC ............ G06F 9/4443 (2013.01); G06F 3/0481 (2013.01)
USPC ............ 715/802; 719/329; 715/804; 715/767

(58) Field of Classification Search
CPC .... G06F 3/0481; H04N 21/4438; H04W 4/00

USPC ......... 715/802, 807, 766, 767, 794, 769, 797, 715/806, 811
See application file for complete search history.

(56) References Cited

U.S. PATENT DOCUMENTS 5,877,763 A  *  3/1999  Berry et al. .................... 715/803
7,356,775 B2 *  4/2008  Ruelle et al. .................. 715/802
8,422,858 B2 *  4/2013  Morris .......................... 386/241
8,787,731 B2 *  7/2014  Morris .......................... 386/241

(Continued)

FOREIGN PATENT DOCUMENTS

JP      2005-267050     9/2005
JP      2006-59117      3/2006
JP      2006-128806     5/2006

OTHER PUBLICATIONS

International Search Report issued Feb. 24, 2009 in the International (PCT) Application of which the present application is the U.S. National Stage.

*Primary Examiner* — Dino Kujundzic
(74) *Attorney, Agent, or Firm* — Wenderoth, Lind & Ponack, L.L.P.

(57) ABSTRACT

The focus is automatically shifted among a plurality of application windows which are displayed concurrently. In order to achieve this, an interruption of communication processing started by an application corresponding to a first window displayed with the focus is detected. Then a second window to which the focus is to shift is determined based on the detection result and state data. As a result, the focus is automatically shifted, based on the determination result, from the first window displayed on a display section to the second window.

11 Claims, 10 Drawing Sheets

(56) References Cited

U.S. PATENT DOCUMENTS

| | | | |
|---|---|---|---|
| 2004/0095401 A1* | 5/2004 | Tomimori | 345/864 |
| 2004/0189712 A1* | 9/2004 | Rundell | 345/808 |
| 2006/0090169 A1* | 4/2006 | Daniels et al. | 719/320 |
| 2009/0293007 A1* | 11/2009 | Duarte et al. | 715/767 |
| 2010/0138779 A1* | 6/2010 | Portele et al. | 715/802 |

* cited by examiner

| FOCUS STATE DATA | · BEING SET WITH THE FOCUS<br>· BEING RELEASED FROM THE FOCUS |
|---|---|
| APP. COMMUNICATION STATE DATA | · PERFORMING COMMUNICATION PROCESSING<br>· NOT PERFORMING COMMUNICATION PROCESSING<br>· WAITING FOR COMMUNICATION RECOVERY |
| FOCUS RELEASABLE/UNRELEASABLE STATE DATA | · FOCUS RELEASABLE<br>· FOCUS UNRELEASABLE |

(b)

| APPLICATION NAME | APPLICATION A | APPLICATION B |
|---|---|---|
| FOCUS STATE DATA | BEING SET WITH THE FOCUS | BEING RELEASED FROM THE FOCUS |
| APP. COMMUNICATION STATE DATA | PERFORMING COMMUNICATION PROCESSING | NOT PERFORMING COMMUNICATION PROCESSING |
| FOCUS RELEASABLE/ UNRELEASABLE STATE DATA | FOCUS RELEASABLE | FOCUS UNRELEASABLE |

F I G. 7
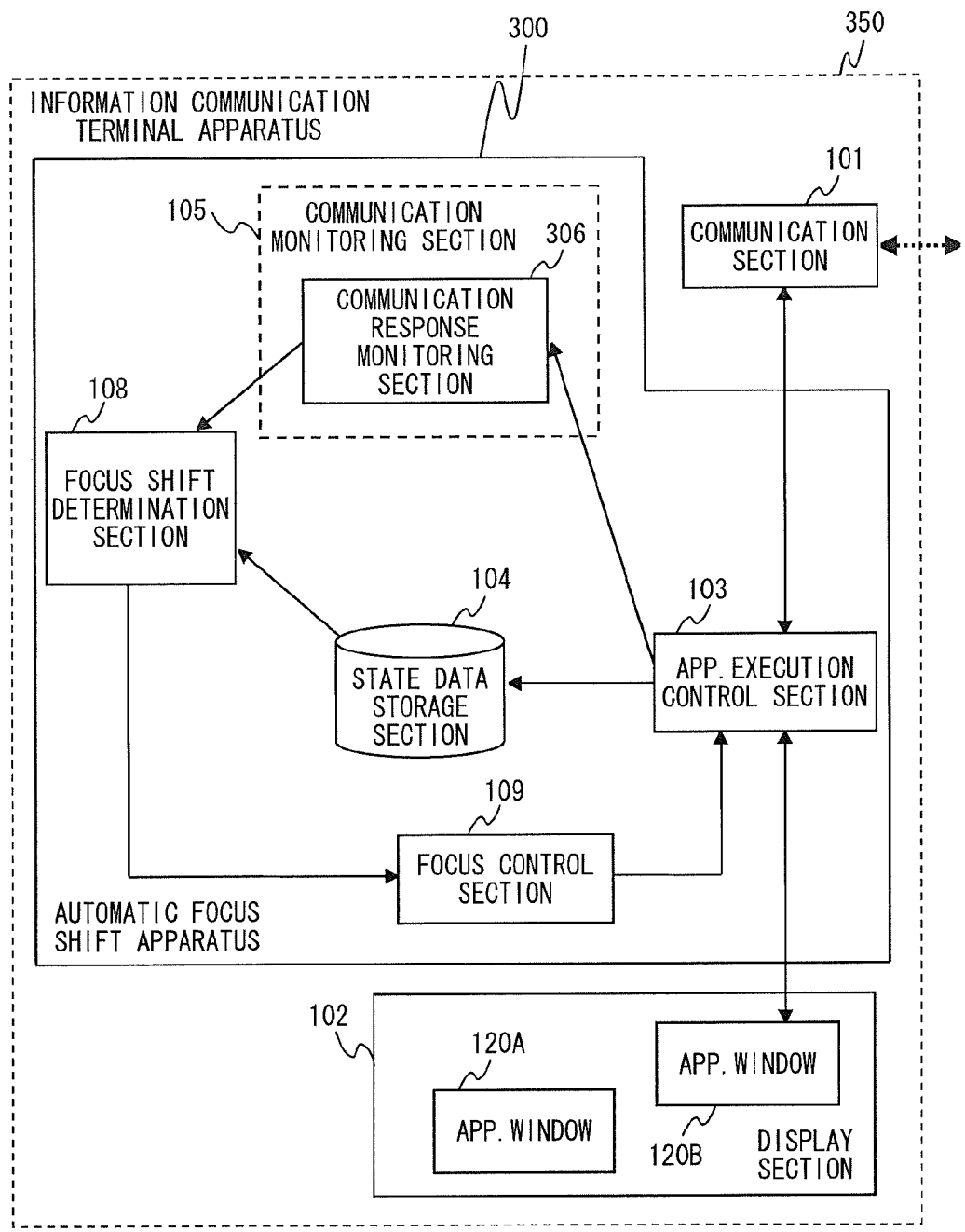

APPARATUS AND METHOD FOR AUTOMATIC FOCUS SHIFT

BACKGROUND OF THE INVENTION

I. Technical Field

The present invention relates to an apparatus and a method for controlling window display for a plurality of applications, and more specifically to an apparatus and a method for controlling window display for a plurality of applications including an application which performs communication.

II. Description of the Related Art

In a multi-window system where a plurality of application windows are displayed concurrently, control of the plurality of windows, typically focus processing and window display/hide processing becomes necessary. Note that, the focus processing is the processing for specifying, as an operation target, a window among a plurality of windows respectively corresponding to a plurality of running applications. In addition, focusing means specifying a window as an operation target.

Here, in an information communication terminal apparatus (e.g., a personal computer) where a pointing device such as a mouse is applicable as an input device, a user can specify the operation target window by a simple operation. On the other hand, an information communication terminal apparatus (e.g., a mobile telephone) for which a pointing device such as a mouse cannot be used as an input device, is assumed to be operated by button operations, so that a user is forced to specify the operation target window by a complicated operation. As described above, in the mobile telephone and the like, the input operation is complicated, so that techniques for automating the window control are developed.

An example of a conventional technique for automating the window control is disclosed in Japanese Laid-Open Patent Publication No. 2006-128806. This conventional technique is the technique for automatically controlling a communication apparatus control window in accordance with the communication state of an information communication terminal apparatus. Specifically, when a radio field intensity obtained from a data communication card is lower than a predetermined level, the communication apparatus control window is automatically closed, and when the radio field intensity is higher than the predetermined level, the communication apparatus control window is automatically opened. In this manner, in the conventional technique, the communication monitoring window is switched between displayed/hidden states depending on the communication state.

SUMMARY OF THE INVENTION

However, according to the above-described conventional technique, when a display state of a window that a user is operating (a window that is being displayed with the focus) is automatically varied, a problem occurs that the user cannot continue input operations. Specifically, according to the above-described conventional technique, when the window that the user is operating is automatically closed, it is necessary for the user to perform an operation to specify the operation target window by selecting another window which the user desires to operate. In other words, according to the above-described conventional technique, when the window that the user is operating is automatically closed, it is necessary for the user to input an instruction to the information communication terminal apparatus in order to cause the information communication terminal apparatus to perform the focus processing for the other window.

Therefore, an object of the present invention is to provide an apparatus and a method for automatic focus shift for automatically shifting the focus to another application that is operable when an application using a communication function temporarily becomes inoperative owing to, for example, deterioration in communication state. Another object of the present invention is to provide an apparatus and a method for automatic focus shift for, when, for example, the deterioration in communication state or the like of the above-described application using the communication function is remedied, causing the focus to automatically shift (return) to the application again.

The present invention is directed to an automatic focus shift apparatus included in an information communication terminal apparatus which concurrently displays a plurality of application windows on a display section and which performs communication with another apparatus by using a communication section. In order to attain the above-described object, in the automatic focus shift apparatus of the present invention, the display section displaying one a window with the focus as an operation target of a user among the plurality of windows currently being displayed, and the automatic focus shift apparatus of the present invention includes: a state data storage section for storing data indicating an execution state of each application as state data; a communication monitoring section for detecting an interruption of communication processing started by an application corresponding to a first window displayed with the focus, and outputting interruption information; a focus shift determination section for determining, based on the state data, when the interruption information from the communication monitoring section is inputted, a second window to which the focus is to shift; an application execution control section for controlling application execution processing for, at least, applications respectively corresponding to the plurality of windows being currently displayed on the display section; and a focus control section for instructing the application execution control section to shift the focus in accordance with the determination by the focus shift determination section, wherein the application execution control section causes, in accordance with the instruction by the focus control section, the focus to shift from the first window displayed on the display section to the second window.

It is preferable that the communication monitoring section further detects recovery of interrupted communication processing, and outputs recovery information; the focus shift determination section further determines, based on the state data, when the recovery information from the communication monitoring section is inputted, whether or not to cause the focus to return from the second window to the first window; the focus control section further instructs the application execution control section, when the focus shift determination section determines to cause the focus to return from the second window to the first window, to return the focus in accordance with the determination by the focus shift determination section; and the application execution control section further causes the focus to return, in accordance with the instruction by the focus control section, from the second window displayed on the display section to the first window.

Further, it is preferable that the application execution control section further updates, using a latest execution state of each application, the state data stored in the state data storage section.

In addition, when detecting that the information communication terminal apparatus is not located inside the service area, the communication monitoring section may determine to have detected the interruption of the communication processing and output the interruption information, and when detecting that the information communication terminal apparatus is located inside the service area, the communication monitoring section may determine to have detected the recovery of the interrupted communication processing and output the recovery information.

Further, when detecting a communication error response transmitted from a partner apparatus of the communication processing, the communication monitoring section may determine to have detected the interruption of the communication processing and output the interruption information, and when not detecting the communication error response to dummy communication which is periodically performed by the communication section with the partner apparatus of the communication, the communication monitoring section may determine to have detected the recovery of the interrupted communication processing and output the recovery information.

Furthermore, when not detecting, within a predetermined period, a completion response transmitted from a partner apparatus of the communication processing, the communication monitoring section may determine to have detected the interruption of the communication processing and output the interruption information, and when detecting the completion response transmitted from the partner apparatus of the communication processing, the communication monitoring section may determine to have detected the recovery of the interrupted communication processing and output the recovery information.

Still further, it is preferable that the state data includes application communication state data indicating that each application is in which one of the states of currently performing communication processing, of not performing communication processing, and of waiting for communication recovery; and focus releasable/unreleasable state data indicating whether or not each application is in a state of allowing the focus on a corresponding window to be released to shift to another application window. The focus shift determination section determines, when the interruption information from the communication monitoring section is inputted, on condition that the focus releasable/unreleasable state data of the application corresponding to the first window indicates the state of allowing the focus to shift to another application window, a window of an application having the application communication state data indicating the state of not performing the communication processing, to be the second window to which the focus is to shift. Also, the focus shift determination section determines, when the recovery information from the communication monitoring section is inputted, on condition that the focus releasable/unreleasable state data of the application corresponding to the second window indicates the state of allowing the focus to shift to another application window, and on condition that the application communication state data of the application corresponding to the first window indicates the state of waiting for communication recovery, to cause the focus to return from the second window to the first window.

Still further, the state data includes priority data in which a priority order set for an application becomes higher in accordance with an increase in frequency of shifting the focus to a window corresponding to the application, and the focus shift determination section may determine, when the interruption information from the communication monitoring section is inputted, a window of an application for which the priority data indicates a higher priority, to be the second window to which the focus is to shift.

Still further, a series of processing as described above that the automatic focus shift apparatus performs may also be considered as a method used by the automatic focus shift apparatus.

According to the above-described invention, an apparatus and a method for automatic focus shift can be provided, which automatically shift the focus to another operable application even when an application using a communication function temporarily becomes inoperative due to, for example, deterioration in communication state. Further, according to the above-described invention, an apparatus and method for automatic focus shift can be provided, which automatically shift (return) the focus to the application again when the deterioration in communication state or the like of the above-described application using the communication function is remedied.

BRIEF DESCRIPTION OF THE DRAWINGS

FIG. 3 illustrates state data stored in a state data storage section 104.

FIG. 7 is a block diagram illustrating an exemplary configuration of an information communication terminal apparatus 350 including an automatic focus shift apparatus 300 according to a third embodiment of the present invention.

DETAILED DESCRIPTION OF THE INVENTION

Hereinafter, embodiments of the present invention will be described with reference to the drawings.

First Embodiment

Figure 1:
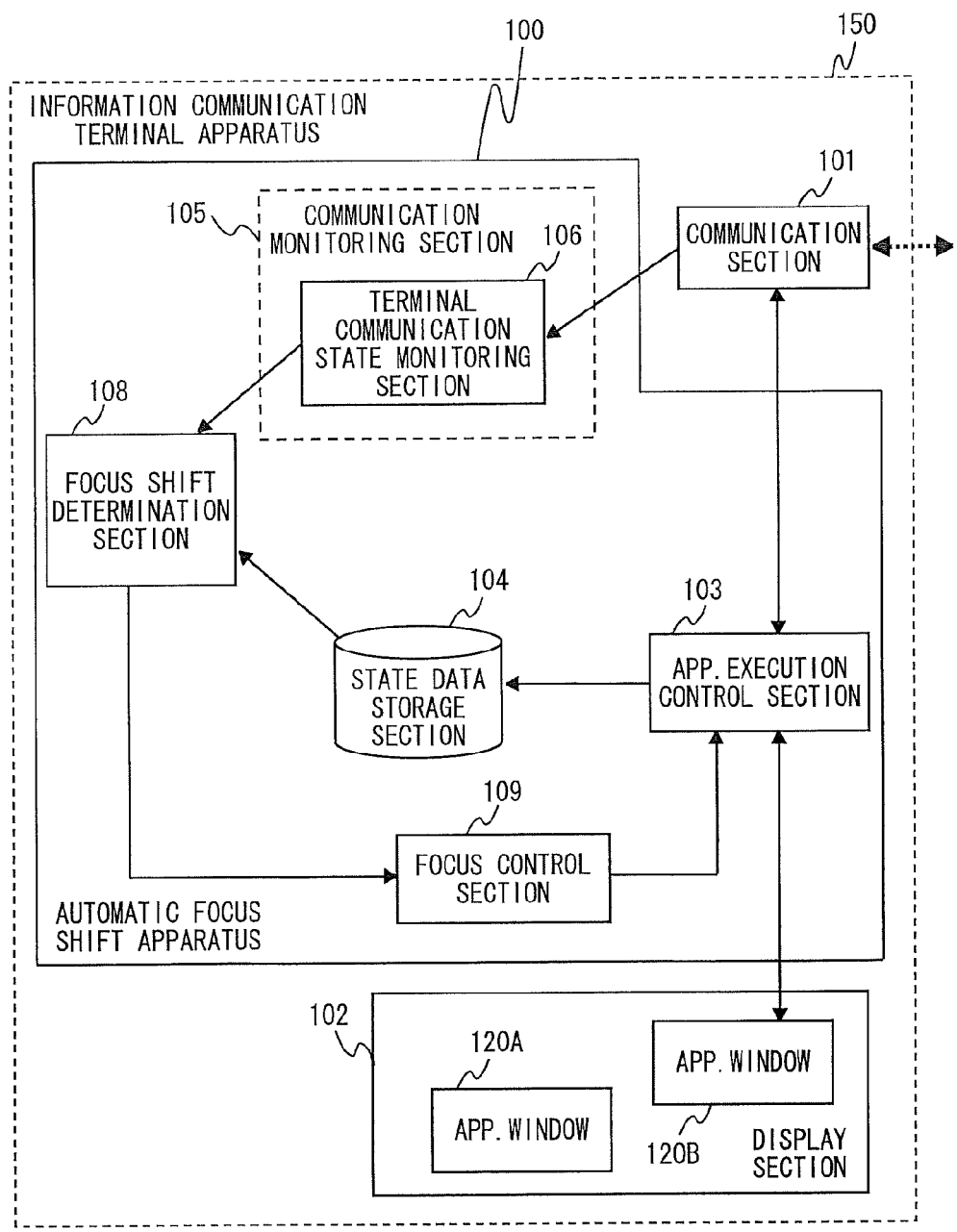
FIG. 1 is a block diagram illustrating an exemplary configuration of an information communication terminal apparatus 150 including an automatic focus shift apparatus 100 according to a first embodiment of the present invention.

FIG. 1 is a block diagram illustrating an exemplary configuration of an information communication terminal apparatus 150 including an automatic focus shift apparatus 100 according to a first embodiment of the present invention. As illustrated in FIG. 1, the information communication terminal apparatus 150 includes the automatic focus shift apparatus 100, a communication section 101, and a display section 102. The automatic focus shift apparatus 100 includes an app.

execution control section 103, a state data storage section 104, a communication monitoring section 105, a focus shift determination section 108, and a focus control section 109. The communication monitoring section 105 includes a terminal communication state monitoring section 106.

The information communication terminal apparatus 150 is typically a mobile telephone terminal, having a communication function, and executes an application using the function. The application that uses the communication function can perform communication processing only when the information communication terminal apparatus 150 is located inside a service area. Note that any device that has a communication function can be used as the information communication terminal apparatus 150. For example, the information communication terminal apparatus 150 may be an audio-video equipment such as a digital camera or an audio player, or a mobile information terminal such as a PDA or a game machine.

The communication section 101 manages whether or not the information communication terminal apparatus 150 is located inside the service area, and performs communication processing with another communication apparatus (a server or the like) in accordance with an instruction from the app. execution control section 103. When the communication section 101 performs a communication request to the other communication apparatus (hereinafter, referred to as a communication partner server) and, as a result, receives a temporary error response from the communication partner server to the communication request, the communication section 101 periodically inquires of the communication partner server in order to check whether or not the communication partner server has recovered to the state of being able to respond to the communication request. This inquiry is typically a dummy communication request.

Figure 2:
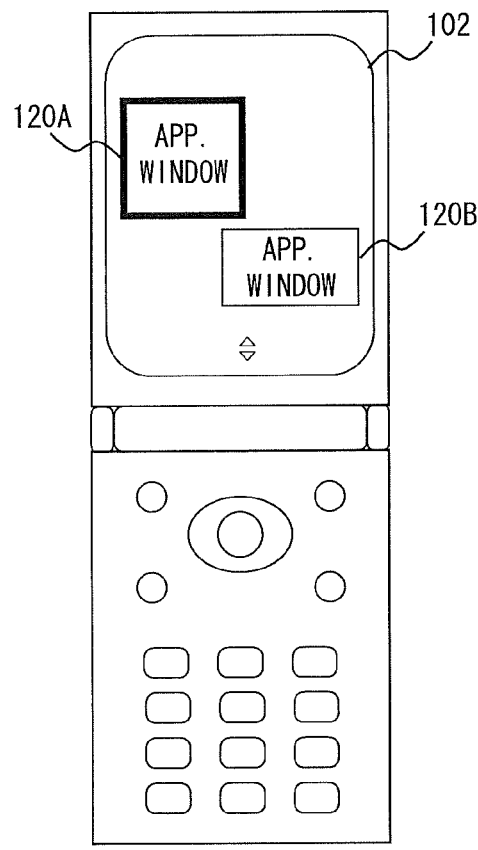
FIG. 2 illustrates the focus of an app. window window, which is performed on the display section 102.

The display section 102 can concurrently display a plurality of application windows (hereinafter, referred to as app. windows, or simply referred to as windows) that are execution screens of applications. Further, the display section 102 displays an app. window with the focus, which is an operation target that a user desires to operate, so as to distinguish the app. window from another app. window which is not the operation target of the user. FIG. 2 illustrates the focus of an app. window, which is performed on the display section 102. In FIG. 2, a case is illustrated as an example where the information communication terminal apparatus 150 is a mobile telephone. As illustrated in FIG. 2, the display section 102 concurrently displays an app. window 120A, which is the execution screen of an application A, and an app. window 120B, which is the execution screen of an application B. The app. window 120A is being displayed with the focus, and the app. window 120B is being displayed without the focus. In FIG. 2, as an example, a heavy line indicates the outline of the app. window 120A being displayed with the focus. This allows the user to recognize the app. window 120A as the operation target. Note that any method by which the user can identify an application window that is an operation target, may be used as a method for displaying an application window with the focus. For example, displaying an application window with the focus may be performed such that an application window that is an operation target is displayed in a different color.

The state data storage section 104 stores state data indicating execution states of an application. FIG. 3 illustrates the state data stored in the state data storage section 104. FIG. 3(a) illustrates types of the state data. As illustrated in FIG. 3(a), the state data includes "focus state data", "app. communication state data", and "focus releasable/unreleasable state data". The "focus state data" indicates either a state of "being set with the focus" or a state of "being released from the focus". Here, the state of being set with the focus is defined as a state of an application corresponding to an app. window which is being displayed with the focus. In FIG. 2, an application A corresponding to the app. window 120A, which is being displayed with the focus, is in the state of being set with the focus. In addition, the state of being released from the focus is defined as a state of an application corresponding to an app. window which is being displayed without the focus. In FIG. 2, an application B corresponding to the app. window 120B, which is being displayed without the focus, is in the state of being released from the focus. The "app. communication state data" indicates one of the states of "performing communication processing", "not performing communication processing", or "waiting for communication recovery". The "focus releasable/unreleasable state data" indicates either one of the states of being "focus releasable" or "focus unreleasable" in accordance with the execution state of an application. The execution state of an application corresponding to the state of being "focus unreleasable" is, for example, the state of an e-mail application being in the course of creating an e-mail, or the state of an e-mail application being accepting continuous key inputs by a user. FIG. 3(b) illustrates an example of the state data stored in the state data storage section 104. In FIG. 3(b), for example, concerning the application A, the "focus state data" indicates the state of "being set with the focus", the "app. communication state data" indicates "performing communication processing", and the "focus releasable/unreleasable state data" indicates "focus releasable". Also, for example, concerning the application B, the "focus state data" indicates "being released from the focus", the "app. communication state data" indicates "not performing communication processing", and the "focus releasable/unreleasable state data" indicates "focus releasable".

The app. execution control section 103 controls processing of executing a plurality of applications. Specifically, the app. execution control section 103 causes the communication section 101 to perform communication processing in response to a request from an application, causes the display section 102 to shift the focus among the app. windows in response to a request from the focus control section 109, and always keeps the state data stored in the state data storage section 104 up-to-date in accordance with the execution states of each application.

The communication monitoring section 105 includes a terminal communication state monitoring section 106 described below.

The terminal communication state monitoring section 106 monitors whether or not the information communication terminal apparatus 150 is located inside the service area by inquiring of the communication section 101. It is desirable that the inquiry to the communication section 101 is to be always performed. Further, when the terminal communication state monitoring section 106 detects that the information communication terminal apparatus 150 is not located inside the service area, the terminal communication state monitoring section 106 notifies the focus shift determination section 108 of "interruption information", and then, when the terminal communication state monitoring section 106 detects that the information communication terminal apparatus 150 is located inside the service area, the terminal communication state monitoring section 106 notifies the focus shift determination section 108 of "recovery information". Note that it may be considered that the communication monitoring section 105 including the terminal communication state monitoring section 106 notifies the focus shift determination section 108 of the above-described "interruption information" and "recovery information".

When notified of the "interruption information" from the terminal communication state monitoring section 106, the focus shift determination section 108 determines, with reference to the "state data" stored in the state data storage section 104, a destination to which the focus is to shift, and notifies the focus control section 109 of the determination result.

The focus control section 109 performs a request (hereinafter, referred to as a focus shift request) to the app. execution control section 103, based on the determination result provided by the focus shift determination section 108, for shifting the focus among the app. windows displayed on the display section 102.

Figure 4:
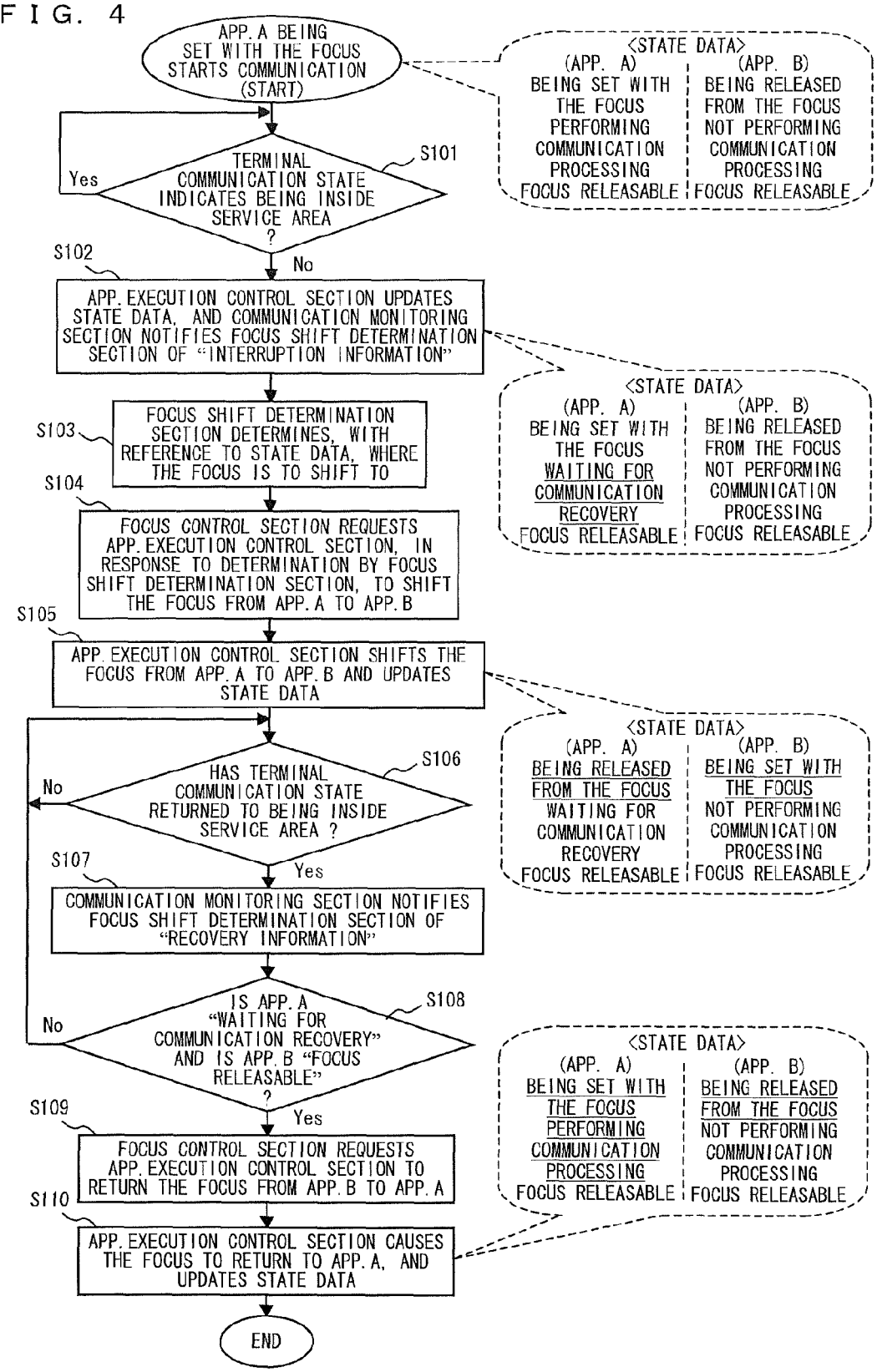
FIG. 4 is a flowchart illustrating an operation of the automatic focus shift apparatus 100 according to the first embodiment of the present invention.

FIG. 4 is a flowchart illustrating an operation of the automatic focus shift apparatus 100 according to the first embodiment. Hereinafter, the operation of the automatic focus shift apparatus 100 will be described in detail with reference to FIG. 4.

Here, the description begins with the time point at which communication processing of the application A starts under conditions (see FIG. 2) of the information communication terminal apparatus 150 where the application A and the application B are running concurrently, app. windows corresponding to the respective applications are displayed concurrently on the display section 102, and the application A is in the state of being set with the focus as an operation target. Note that the state data stored in the state data storage section 104 at the starting point is illustrated in FIG. 3(b). Further, in the descriptions below, an application may be simply referred to as an app.

Initially, in step S101, the terminal communication state monitoring section 106 included in the communication monitoring section 105 detects whether or not the terminal communication state of the information communication terminal apparatus 150 indicates the state of being inside the service area. Specifically, the terminal communication state monitoring section 106 detects whether or not the communication state of the information communication terminal apparatus 150 indicates the state of being inside the service area, by inquiring of the communication section 101 which manages whether or not the information communication terminal apparatus 150 is located inside the service area. In the case where the terminal communication state indicates the state of being inside the service area, the operation in step S101 is repeatedly performed. In such a case, the communication processing of the application A being set with the focus is continued, so that processing of the application A is normally continued. On the other hand, in the case where it is detected that the terminal communication state does not indicate the state of being inside the service area (indicates the state of being outside the service area), the processing proceeds to step S102. In such a case, since the communication processing of the application A in the state of being set with the focus is interrupted (or has failed to start), the processing of the application A is also interrupted.

In step S102, the app. execution control section 103 recognizes that the communication processing of the application A, which the app. execution control section 103 causes the communication section 101 to perform, is interrupted (or has failed to start) due to an error caused by being outside the service area, and updates the app. communication state data of the application A to "waiting for communication recovery". Further, in step S102, the terminal communication state monitoring section 106 notifies the focus shift determination section 108 of the "interruption information". Here, the "interruption information" is information indicating that communication processing performed by an application is interrupted. Note that it may be considered that the communication monitoring section 105 including the terminal communication state monitoring section 106 notifies the focus shift determination section 108 of the "interruption information".

Next, in step S103, the focus shift determination section 108 determines, with reference to the state data of each application stored in the state data storage section 104, an application to which the focus is to shift, and notifies the focus control section 109 of the determination. Specifically, the focus shift determination section 108 checks that the state data of the application A in the state of being set with the focus indicates the state of "waiting for communication recovery" and the state of being "focus releasable". As a result, the focus shift determination section 108 recognizes that the processing of the application A in the state of being focus releasable is interrupted, so that the focus shift determination section 108 determines to release the focus from the application A. In addition, the focus shift determination section 108 checks that the state data of the application B being released from the focus indicates the state of "not performing communication processing". As a result, the focus shift determination section 108 recognizes that the application B is in an executable state even when the information communication terminal apparatus 150 is outside the service area, so that the focus shift determination section 108 determines to set the application B to be with the focus. That is, the focus shift determination section 108 determines, based on the state data, to shift the focus from an application (application A) in the state of being focus releasable and of the processing being interrupted, to another application (application B) which can perform processing. Then, the focus shift determination section 108 notifies the focus control section 109 of the determination.

Next, in step S104, the focus control section 109 requests the app. execution control section 103, in response to the determination by the focus shift determination section 108, to shift the focus from the application A to the application B.

Next, in step S105, the app. execution control section 103 causes the focus to shift from the application A to the application B in response to the request from the focus control section 109. Specifically, the app. execution control section 103 controls the display section 102 to display an app. window 120A corresponding to the application A without the focus, and an app. window 120B corresponding to the application B with the focus. In addition, the app. execution control section 103 updates the state data of the application A to "being released from the focus", and the state data of the application B to "being set with the focus".

Next, in step S106, the terminal communication state monitoring section 106 included in the communication monitoring section 105 detects whether or not the terminal communication state of the information communication terminal apparatus 150 has returned to inside the service area. Specifically, the terminal communication state monitoring section 106 detects whether or not the terminal communication state of the information communication terminal apparatus 150 has returned to inside the service area by inquiring of the communication section 101 which manages whether or not the information communication terminal apparatus 150 is located inside the service area. In the case where it is not detected that the terminal communication state has returned to inside the service area, the operation in step S106 is repeatedly performed. In such a case, the state of the application B is maintained as being set with the focus. On the other hand, in the case where it is detected that the terminal communication state has returned to inside the service area, the processing proceeds to step S107. In such a case, the communication processing of the application A being released from the focus can be resumed.

Next, in step S107, the terminal communication state monitoring section 106 notifies the focus shift determination section 108 of the "recovery information". Here, the "recovery information" is information indicating that interrupted communication processing performed by an application has recovered. Note that it may be considered that the communication monitoring section 105 including the terminal communication state monitoring section 106 notifies the focus shift determination section 108 of the "recovery information".

Next, in step S108, the focus shift determination section 108 determines, with reference to the state data, stored in the state data storage section 104, of each application, whether or not both the state data of the application A being released from the focus indicates the state of "waiting for communication recovery", and the state data of the application B being set with the focus indicates the state of being "focus releasable". That is, the focus shift determination section 108 determines whether or not to cause the focus to return (shift) from the application B to the application A. When the determination in step S108 is "No" in step S108, the processing returns to step S106. When the determination in step S108 is "Yes", the focus shift determination section 108 determines to cause the focus to return (shift) from the application B to the application A, and notifies the focus control section 109 of the determination. Then, the processing proceeds to step S109.

Next, in step S109, the focus control section 109 requests, in accordance with the determination by the focus shift determination section 108, the app. execution control section 103 to cause the focus to return (shift) from the application B to the application A.

Next, in step S110, the app. execution control section 103 causes, in response to the request from the focus control section 109, the focus to return from the application B to the application A. Specifically, the app. execution control section 103 controls the display section 102 to display the app. window 120B corresponding to the application B without the focus, and the app. window 120A corresponding to the application A with the focus. In addition, the app. execution control section 103 updates the state data of the application A to "being set with the focus" and the state of "performing communication processing", and updates the state data of the application B to "being released from the focus". Thereafter, the series of processing ends.

As described above, when the communication processing of an application in the state of being set with the focus becomes unable to be performed, and processing of the application is interrupted (or has failed to start) because the information communication terminal apparatus 150 is located outside the service area, the automatic focus shift apparatus 100 according to the first embodiment can automatically shift the focus to another application which can perform processing. Further, when the information communication terminal apparatus 150 returns to inside the service area, the automatic focus shift apparatus 100 according to the first embodiment can automatically cause the focus to return (shift) to the previous application again.

Accordingly, when an application that the user is operating becomes temporarily inoperative because of being outside the service area, the automatic focus shift apparatus 100 according to the first embodiment allows the user, without any particular input operation, to automatically start an operation of another operable application. Further, when returning to inside the service area, the automatic focus shift apparatus 100 according to the first embodiment allows the user, without any particular input operation, to automatically resume an operation of the application that has been inoperative. As a result, operability of the information communication terminal apparatus 150 including the automatic focus shift apparatus 100 is enhanced, and utilization efficiency of the application executed by the information communication terminal apparatus 150 is also enhanced.

In addition, in the automatic focus shift apparatus 100 according to the first embodiment, the terminal communication state monitoring section 106 (communication monitoring section 105) can always monitor whether or not the information communication terminal apparatus 150 is inside the service area. Because of this, even when an application, whose usage frequency of the communication function varies, is executed, the focus can be shifted timely and promptly.

Second Embodiment

The automatic focus shift apparatus 100 according to the first embodiment appropriately shifts the focus for an application in accordance with whether or not the information communication terminal apparatus 150 including the automatic focus shift apparatus 100 is located inside the service area. On the other hand, an automatic focus shift apparatus 200 according to a second embodiment appropriately shifts the focus for an application in accordance with whether or not a communication error response from a communication partner server has been detected (i.e., in accordance with whether or not the communication environment of the communication partner server is favorable).

Figure 5:
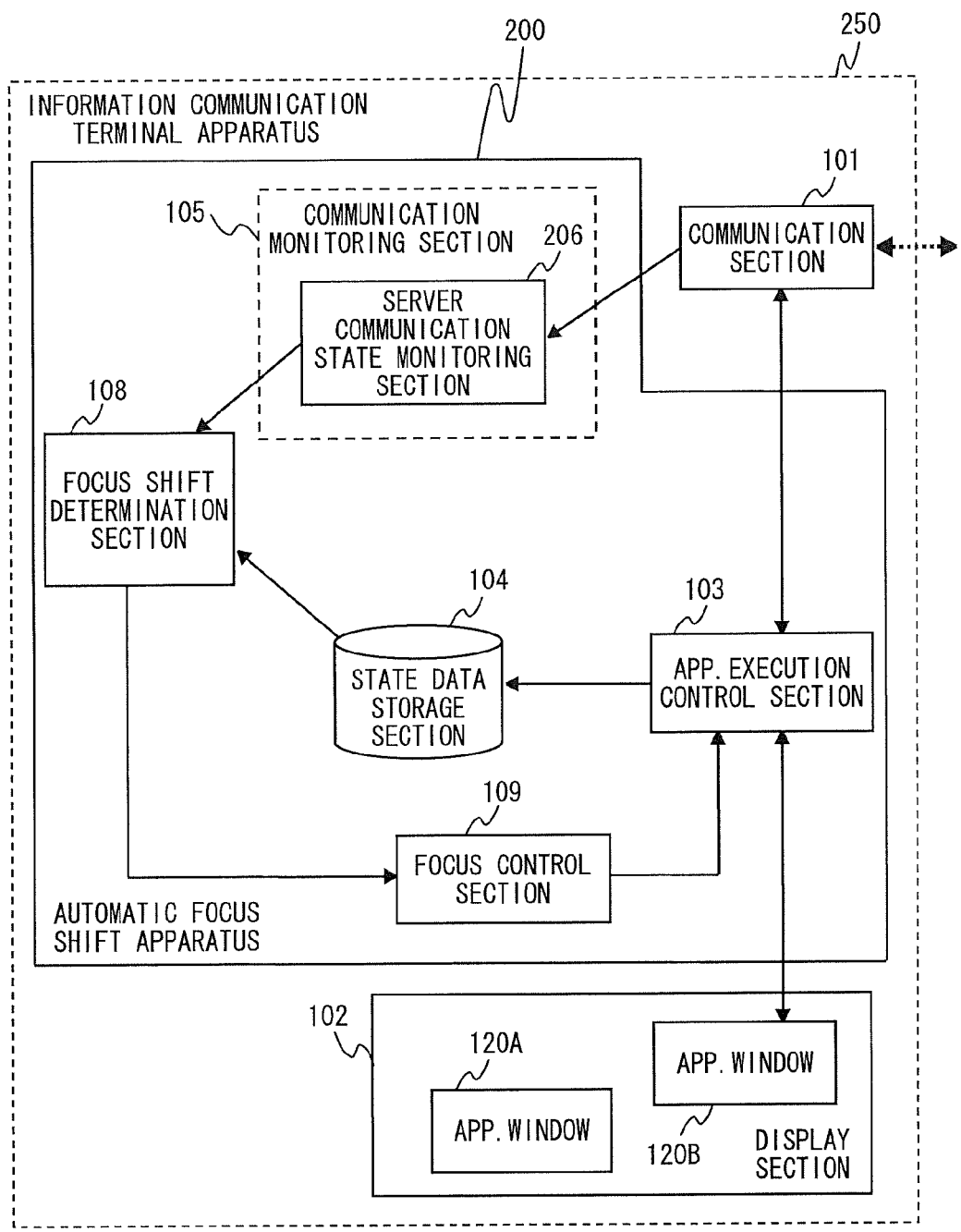
FIG. 5 is a block diagram illustrating an exemplary configuration of an information communication terminal apparatus 250 including an automatic focus shift apparatus 200 according to a second embodiment of the present invention.

FIG. 5 is a block diagram illustrating an exemplary configuration of an information communication terminal apparatus 250 including the automatic focus shift apparatus 200 according to the second embodiment of the present invention. The information communication terminal apparatus 250 includes the automatic focus shift apparatus 200 instead of the automatic focus shift apparatus 100 in the information communication terminal apparatus 150 (see FIG. 1) described in the first embodiment. The automatic focus shift apparatus 200 includes a server communication state monitoring section 206 instead of the terminal communication state monitoring section 106 included in the communication monitoring section 105 of the automatic focus shift apparatus 100 according to the first embodiment. In the following description, the matter described in the first embodiment is essentially omitted.

The communication monitoring section 105 includes the server communication state monitoring section 206 described below.

The server communication state monitoring section 206 monitors whether or not the communication partner server, which has received a communication request from an application of the information communication terminal apparatus 250, is in a state of being communicable. Specifically, the server communication state monitoring section 206 monitors whether or not the communication error response (hereinafter, simply referred to as the error response) giving notice of a state of the communication section 101 temporarily being unable to respond is received from the communication partner server which has received the communication request from the application. When the server communication state monitoring section 206 detects the error response, the server communication state monitoring section 206 determines that the communication partner server is in the state of temporarily being unable to respond to the communication request, and accordingly notifies the focus shift determination section 108 of the "interruption information". Note that the server communication state monitoring section 206 detects the error response typically in the case where the communication environment of the communication partner server is unfavorable. In addition, when the server communication state monitoring section 206 detects that the communication partner server has recovered to the state of being communicable after notifying the focus shift determination section 108 of the "interruption information", the server communication state monitoring section 206 notifies the focus shift determination section 108 of the "recovery information". Here, when the communication section 101 receives the error response from the communication partner server, the communication section 101 periodically performs the dummy communication request to the communication partner server. This allows the server communication state monitoring section 206 to detect that the communication partner server has recovered to the state of being communicable, by checking that the communication section 101 has not received the error response to the dummy communication request. Note that it may be considered that the communication monitoring section 105 including the server communication state monitoring section 206 notifies the focus shift determination section 108 of the above-described "interruption information" and "recovery information".

Figure 6:
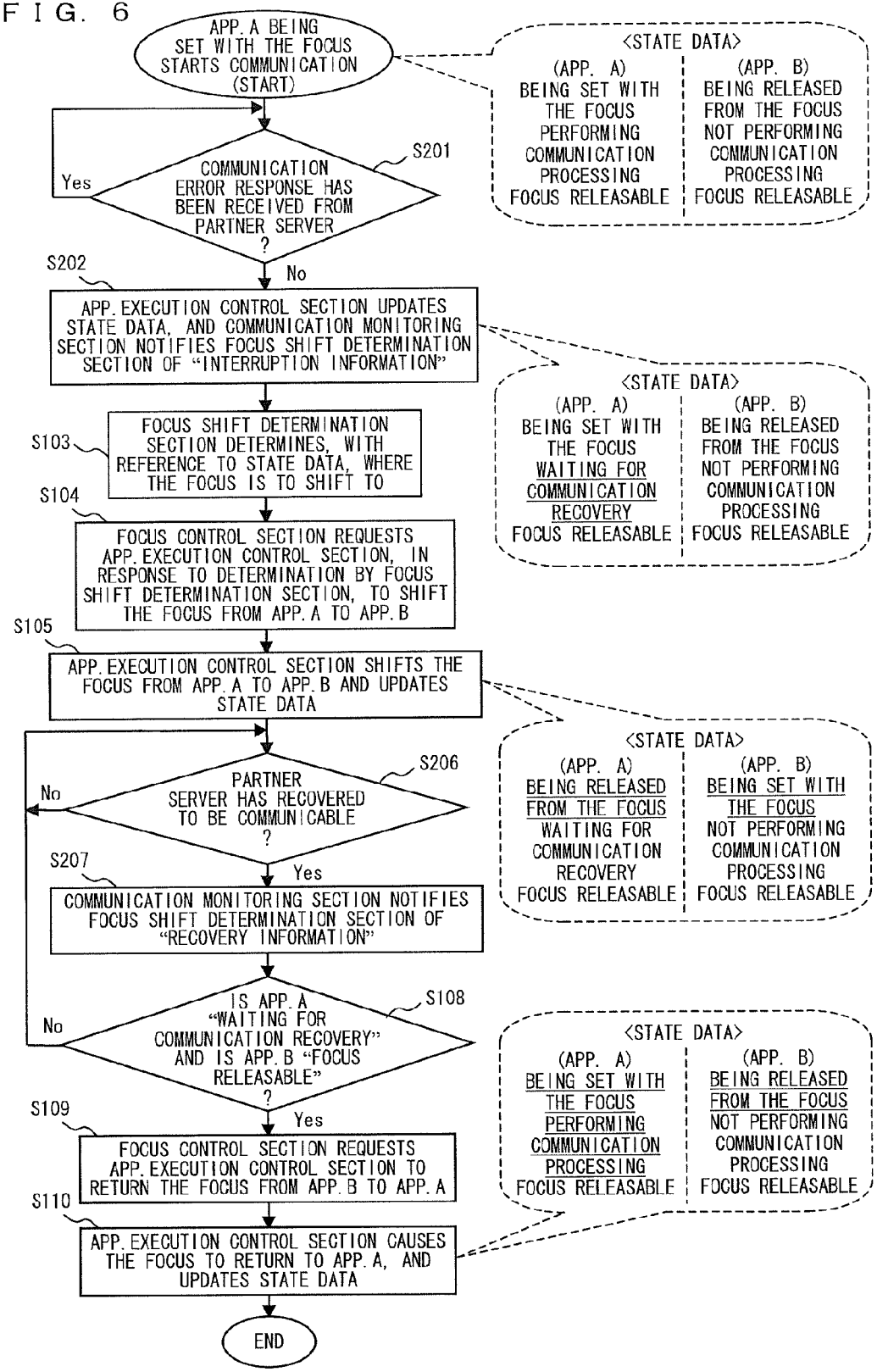
FIG. 6 is a flowchart illustrating an operation of the automatic focus shift apparatus 200 according to the second embodiment of the present invention.

FIG. 6 is a flowchart illustrating an operation of the automatic focus shift apparatus 200 according to the second embodiment. In the flowchart of FIG. 6, in comparison with the flowchart of FIG. 4 described in the first embodiment, step S101 is replaced with step S201, step S102 with step S202, step S106 with step S206, and step S107 with step S207. Accordingly, a description that overlaps the description in the first embodiment is essentially omitted, and operations in steps S201, S202, S206, and S207 are described below.

In step S201, the server communication state monitoring section 206 detects whether or not the communication section 101 has received the error response from the communication partner server which has received the communication request from the application of the information communication terminal apparatus 250. This allows the server communication state monitoring section 206 to detect whether or not the communication partner server is in the state of being communicable. In the case where the communication section 101 has not received the error response from the communication partner server, the operation in step S201 is repeatedly performed. In such a case, the communication processing of the application A being set with the focus is continued (or started), and, as a result, the processing of the application A is normally continued. On the other hand, in the case where the communication section 101 receives the error response from the communication partner server, the processing proceeds to step S202. In such a case, the communication processing of the application A being set with the focus is interrupted (or has failed to start), and, as a result, the processing of the application A is also interrupted.

In step S202, the app. execution control section 103 recognizes that the communication processing of the application A, which the communication section 101 is caused to perform, is interrupted (or has failed to start) because the communication section 101 has received the error response from the communication partner server, and updates the app. communication state data of the application A to "waiting for communication recovery". In addition, in step S202, the server communication state monitoring section 206 notifies the focus shift determination section 108 of the "interruption information". Note that it may can be considered that the communication monitoring section 105 including the server communication state monitoring section 206 notifies the focus shift determination section 108 of the "interruption information".

In step S206, the server communication state monitoring section 206 detects whether or not the communication partner server has recovered to the state of being communicable. Specifically, the server communication state monitoring section 206 detects that the communication partner server has recovered to the state of being communicable, by checking that the communication section 101 has not received the error response to the dummy communication request which is periodically performed. In the case where it is not detected that the communication partner server has recovered to the state of being communicable (when the error response to the dummy communication request is received), the operation in step S206 is repeatedly performed. In such a case, the state of the application B being set with the focus is maintained. On the other hand, in the case where it is detected that the communication partner server has recovered to the state of being communicable (when the error response to the dummy communication request is not received), the processing proceeds to step S207. In such a case, the communication processing of the application A being released from the focus can be resumed.

In step S207, the server communication state monitoring section 206 notifies the focus shift determination section 108 of the "recovery information". Note that it may can be considered that the communication monitoring section 105 including the server communication state monitoring section 206 notifies the focus shift determination section 108 of the "recovery information".

As described above, when the communication processing of the application being set with the focus becomes unable to be performed because deterioration in the communication environment, for example, of the communication partner server causes the communication partner server to be in a state of being incommunicable, and, as a result, the processing of the application is interrupted (or has failed to start), the automatic focus shift apparatus 200 according to the second embodiment can automatically shift the focus to another application which can perform processing. Further, when the communication partner server recovers to the state of being communicable because the communication environment of the communication partner server improves, for example, the automatic focus shift apparatus 200 according to the second embodiment can automatically return (shift) the focus to the previous application again.

In addition, in the automatic focus shift apparatus 200 according to the second embodiment, the server communication state monitoring section 206 (communication monitoring section 105) can always monitor whether or not the communication partner server is in the state of being communicable. Because of this, even when an application, whose usage frequency of the communication function varies, is executed, the focus can be shifted timely and promptly.

Accordingly, when an application that the user is operating becomes temporarily inoperative because the communication partner server is not in the state of being communicable, the automatic focus shift apparatus 200 according to the second embodiment allows the user to automatically start an operation of another operable application without any particular input operation. Further, when the communication partner server recovers to the state of being communicable, the automatic focus shift apparatus 200 according to the second embodiment allows the user, without any particular input operation, to automatically resume an operation of the application that has been inoperative. As a result, operability of the information communication terminal apparatus 250 including the automatic focus shift apparatus 200 is enhanced, and utilization efficiency of the application executed by the information communication terminal apparatus 250 is also enhanced.

Note that in the above-described first and second embodiments, the focus shift determination section 108 determines, in step S103 illustrated in FIG. 4 and FIG. 6, to shift the focus to the application (application B) "not performing communication processing", with reference to the state data. This is because the application (application B) "not performing communication processing" can perform processing. However, in addition to this, the focus shift determination section 108 may determine, in step S103 (see FIG. 6) of the second embodiment, to shift the focus even to an application in the state of "performing communication processing" in the case where the application is performing the communication processing with a server other than the communication partner server which has transmitted the error response. This is because in the case where the application, to which the focus has been shifted, does not perform communication processing with the communication partner server which has transmitted the error response, the application to which the focus has been shifted can perform processing. In such a case, information specifying the communication partner server is attached to data that indicates "performing communication processing" (see FIG. 3) among the state data stored in the state data storage section 104, and the app. execution control section 103 also updates the information specifying the communication partner server.

Third Embodiment

An automatic focus shift apparatus 300 according to a third embodiment appropriately shifts the focus for an application in accordance with whether or not a completion response has been received from a communication partner server within a predetermined period (that is, in accordance with whether or not the communication partner server is normally operating).

FIG. 7 is a block diagram illustrating an exemplary configuration of an information communication terminal apparatus 350 including the automatic focus shift apparatus 300 according to the third embodiment of the present invention. The information communication terminal apparatus 350 includes the automatic focus shift apparatus 300 instead of the automatic focus shift apparatus 100 in the information communication terminal apparatus 150 (see FIG. 1) described in the first embodiment. The automatic focus shift apparatus 300 includes a communication response monitoring section 306 instead of the terminal communication state monitoring section 106 included in the communication monitoring section 105 of the automatic focus shift apparatus 100 according to the first embodiment. In the following description, the matter described in the first embodiment is essentially omitted.

The communication monitoring section 105 includes the communication response monitoring section 306 described below.

The communication response monitoring section 306 monitors whether or not a completion response (hereinafter simply referred to as a completion response), which gives notice of a normal completion of the communication at an application level, has been received from a communication partner server within a predetermined period by inquiring of the app. execution control section 103. That is, the communication response monitoring section 306 monitors whether or not an application of the communication partner server is operating normally. In the case where the communication response monitoring section 306 does not detect a reception of the completion response within the predetermined period, the communication response monitoring section 306 determines that the application of the communication partner server is not operating normally, and notifies the focus shift determination section 108 of the "interruption information". Note that the case where the communication response monitoring section 306 does not detect the reception of the completion response within the predetermined period is typically the case where the communication partner server is in an overloaded state. In addition, when the communication response monitoring section 306 detects that the completion response from the communication partner server has been received after notifying the focus shift determination section 108 of the "interruption information", the communication response monitoring section 306 notifies the focus shift determination section 108 of the "recovery information". Note that it may be considered that the communication monitoring section 105 including the communication response monitoring section 306 notifies the focus shift determination section 108 of the above-described "interruption information" and "recovery information".

Figure 8:
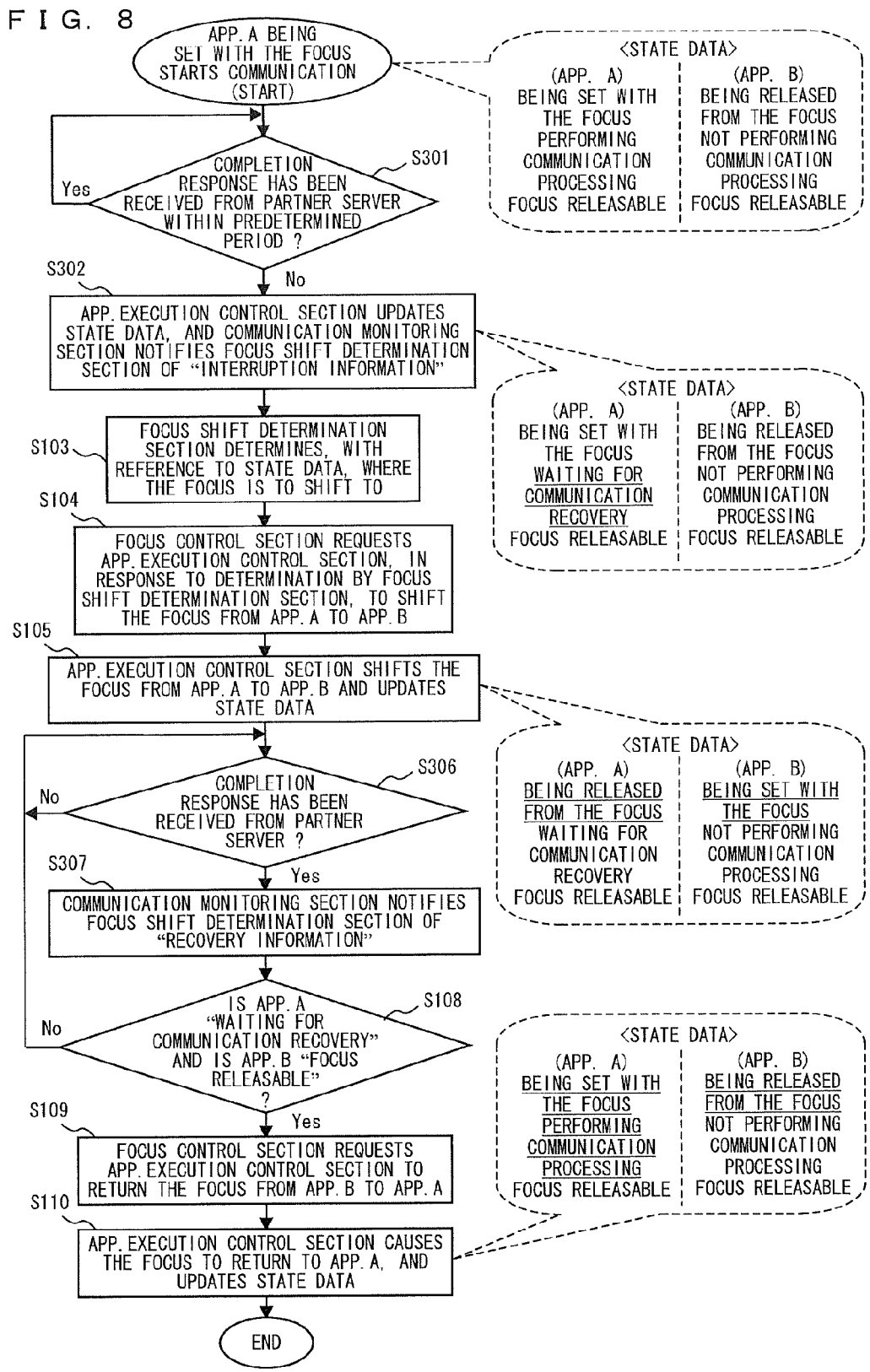
FIG. 8 is a flowchart illustrating an operation of the automatic focus shift apparatus 300 according to the third embodiment of the present invention.

FIG. 8 is a flowchart illustrating an operation of the automatic focus shift apparatus 300 according to the third embodiment. In the flowchart of FIG. 8, in comparison with the flowchart of FIG. 4 described in the first embodiment, step S101 is replaced with step S301, step S102 with step S302, step S106 with step S306, and step S107 with step S307. Accordingly, a description that overlaps the description in the first embodiment is essentially omitted, and operations in steps S301, S302, S306, and S307 are described below.

In step S301, the communication response monitoring section 306 detects whether or not the communication section 101 has received the completion response from the communication partner server within the predetermined period, by inquiring of the app. execution control section 103. Accordingly, the communication response monitoring section 306 can detect whether or not the application of the communication partner server is normally operating. In the case where the communication section 101 receives the completion response from the communication partner server within the predetermined period, the operation in step S301 is repeatedly performed. In such a case, the communication processing of the application A being set with the focus is continued, so that processing of the application A is normally continued. On the other hand, in the case where the communication section 101 does not receive the completion response from the communication partner server within the predetermined period, the processing proceeds to step S302. In such a case, the communication processing of the application A being set with the focus is interrupted, so that processing of the application A is also interrupted.

In step S302, the app. execution control section 103 updates the app. communication state data of the application A to "waiting for communication recovery". In addition, in step S302, the communication response monitoring section 306 notifies the focus shift determination section 108 of the "interruption information". Note that it may be considered that the communication monitoring section 105 including the communication response monitoring section 306 notifies the focus shift determination section 108 of the "interruption information".

In step S306, the communication response monitoring section 306 detects whether or not the completion response from the communication partner server has been received. In the case where it is not detected that the completion response has been received from the communication partner server, the operation in step S306 is repeatedly performed. In such a case, the state of the application B of being set with the focus is maintained. On the other hand, in the case where it is detected that the completion response has been received from the communication partner server, the processing proceeds to step S307. In such a case, the communication processing of the application A being released from the focus can be resumed.

In step S307, the communication response monitoring section 306 notifies the focus shift determination section 108 of the "recovery information". Note that it may be considered that the communication monitoring section 105 including the communication response monitoring section 306 notifies the focus shift determination section 108 of the "recovery information".

As described above, when the communication processing of the application being set with the focus is interrupted because the application of the communication partner server is not normally operating due to the overloaded state, for example, of the communication partner server, and, as a result, the processing of the application is interrupted, the automatic focus shift apparatus 300 according to the third embodiment can automatically shift the focus to another application which can perform processing. Further, when the operation of the application of the communication partner server recovers because the state of the communication partner server improves, the automatic focus shift apparatus 300 according to the third embodiment can automatically return (shift) the focus to the previous application again.

In addition, in the automatic focus shift apparatus 300 according to the third embodiment, the communication response monitoring section 306 (communication monitoring section 105) can always monitor the state of the communication partner server. Because of this, even when an application, whose usage frequency of the communication function varies, is executed, the focus can be shifted timely and promptly.

Accordingly, when the application that the user is operating becomes temporarily inoperative because the communication partner server is not normally operating due to the overload, for example, of the communication partner server, the automatic focus shift apparatus 300 according to the third embodiment allows the user to automatically start the operation of the other operable application without any particular input operation. Further, when the operation of the communication partner server recovers, the automatic focus shift apparatus 300 according to the third embodiment allows the user, without any particular input operation, to automatically resume the operation of the application that has been inoperative. As a result, operability of the information communication terminal apparatus 350 including the automatic focus shift apparatus 300 is enhanced, and utilization efficiency of the application executed by the information communication terminal apparatus 350 is also enhanced.

Note that in the above-described first and third embodiments, the focus shift determination section 108 determines, in step S103 illustrated in FIG. 4 and FIG. 8, to shift the focus to the application (application B) "not performing communication processing", with reference to the state data. This is because the application (application B) "not performing communication processing", can perform processing. However, in addition to this, the focus shift determination section 108 may determine, in step S103 (see FIG. 8) of the third embodiment, to shift the focus even to an application in the state of "performing communication processing" in the case where the application performs the communication processing with a server other than the communication partner server which does not transmit the completion response within the predetermined period. This is because in the case where the application, to which the focus has shifted, does not perform communication processing with the communication partner server which does not transmit the completion response within the predetermined period, the application to which the focus has shifted can perform processing. In such a case, information specifying the communication partner server is attached to data that indicates "performing communication processing" (see FIG. 3) among the state data stored in the state data storage section 104, and the app. execution control section 103 also updates the information specifying the communication partner server.

Fourth Embodiment

An automatic focus shift apparatus 400 according to a fourth embodiment appropriately shifts the focus for an application in accordance with whether or not the information communication terminal apparatus including the automatic focus shift apparatus 400 is located inside the service area (see the first embodiment), whether or not the error response from the communication partner server has been detected (see the second embodiment), and whether or not the completion response has been received from the communication partner server within the predetermined period (see the third embodiment).

Figure 9:
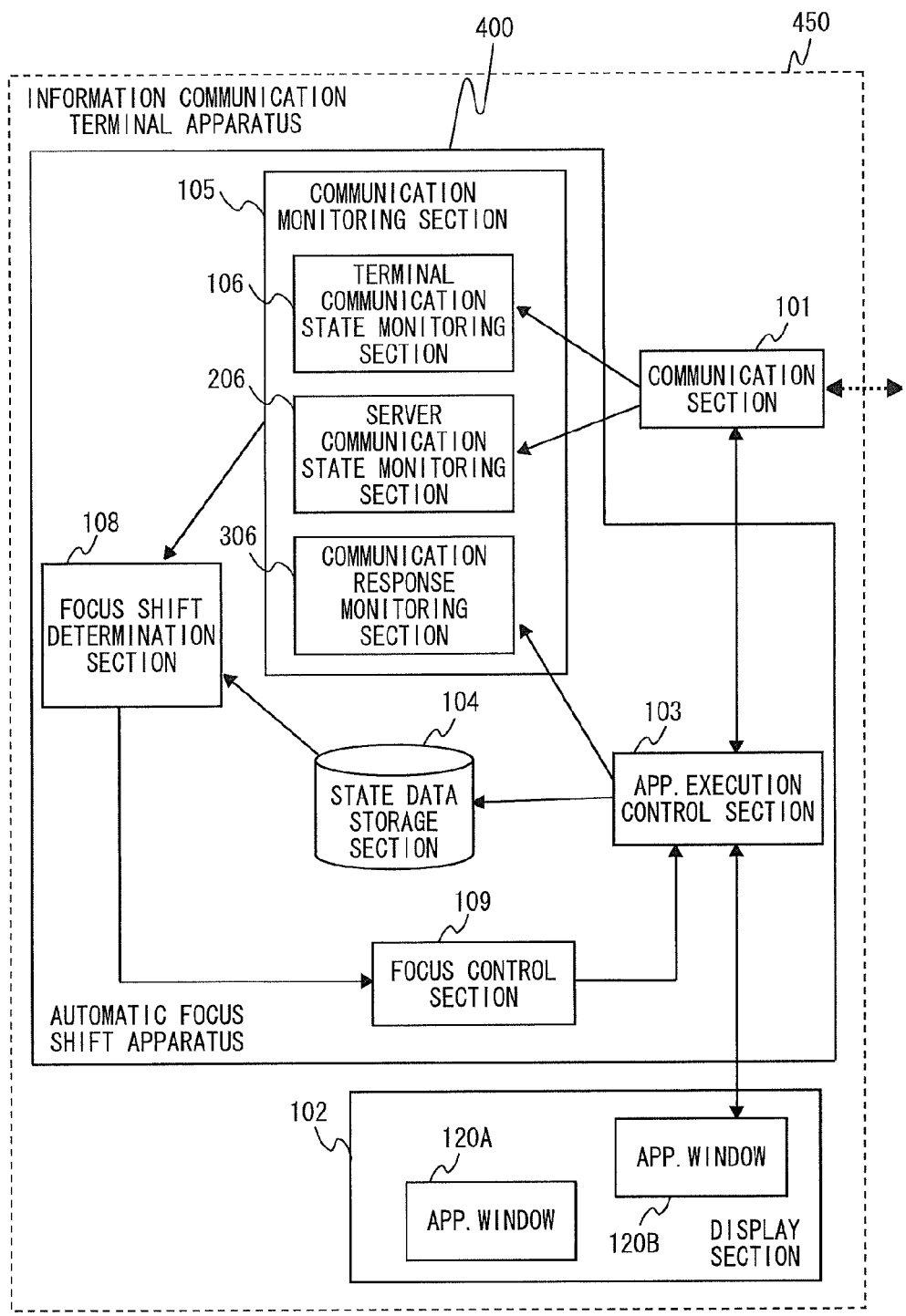
FIG. 9 is a block diagram illustrating an exemplary configuration of an information communication terminal apparatus 450 including an automatic focus shift apparatus 400 according to a fourth embodiment of the present invention.

FIG. 9 is a block diagram illustrating an exemplary configuration of an information communication terminal apparatus 450 including the automatic focus shift apparatus 400 according to the fourth embodiment of the present invention. The information communication terminal apparatus 450 includes the automatic focus shift apparatus 400 instead of the automatic focus shift apparatus 100 in the information communication terminal apparatus 150 (see FIG. 1) described in the first embodiment. As compared to the communication monitoring section 105 of the automatic focus shift apparatus 100 according to the first embodiment, the communication monitoring section 105 of the automatic focus shift apparatus 400 further includes the sever communication state monitoring section 206 (see FIG. 5) described in the second embodiment, and the communication response monitoring section 306 (see FIG. 7) described in the third embodiment. In the following description, the matter described in the first through third embodiments is essentially omitted.

The communication monitoring section 105 includes the terminal communication state monitoring section 106 described in the first embodiment, the server communication state monitoring section 206 described in the second embodiment, and the communication response monitoring section 306 described in the third embodiment.

Figure 10:
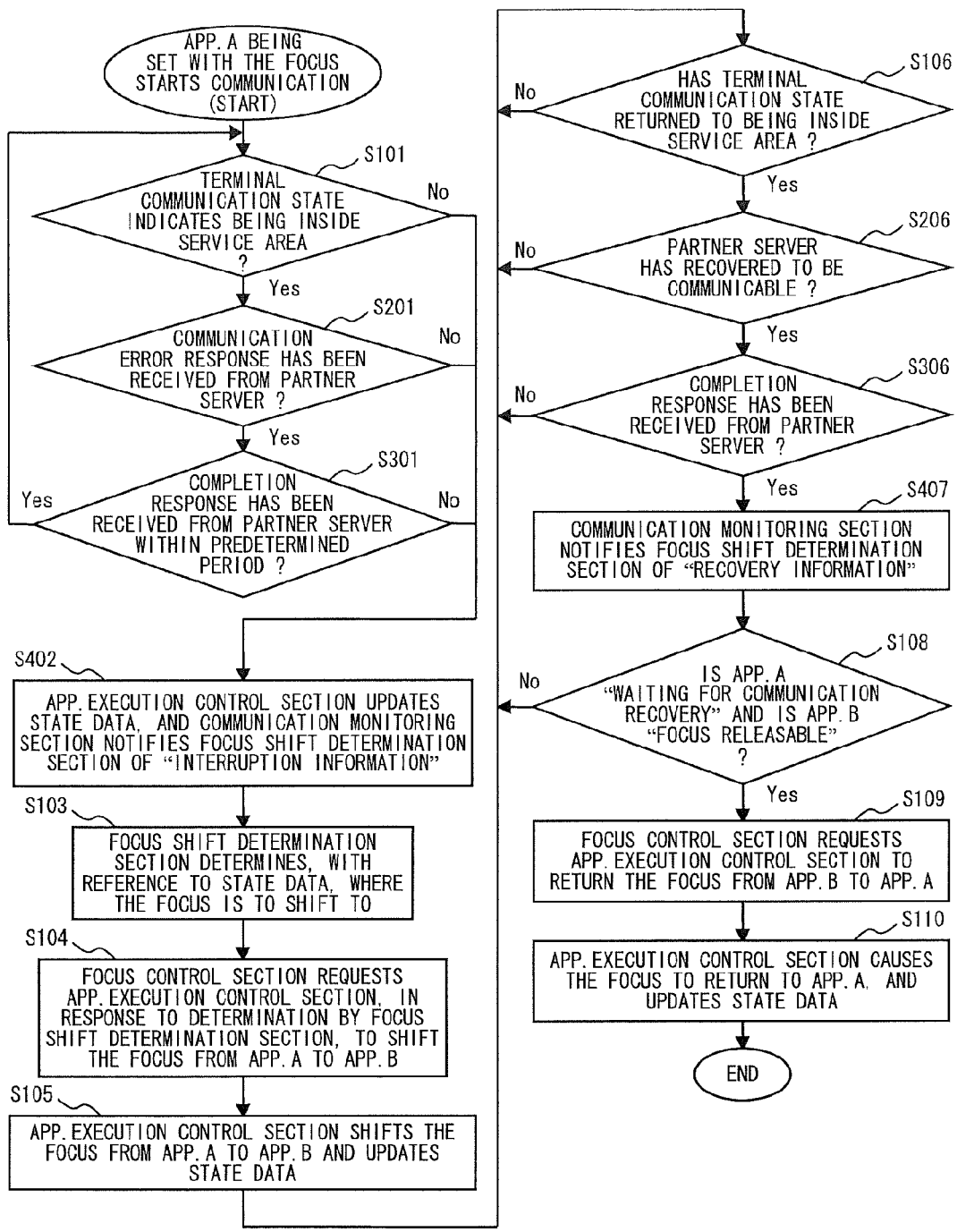
FIG. 10 is a flowchart illustrating an operation of the automatic focus shift apparatus 400 according to the fourth embodiment of the present invention.

FIG. 10 is a flowchart illustrating an operation of the automatic focus shift apparatus 400 according to the fourth embodiment. In the flowchart of FIG. 10, in comparison with the flowchart of FIG. 4 described in the first embodiment, steps S201 and S301 are added after step S101, step S102 is replaced with step S402, steps S206 and S306 are added after step S106, and S107 is replaced with step S407. In the flowchart, steps S201 and S206 are the same as steps S201 and S206 in the flowchart of FIG. 6 in the second embodiment. Further, steps S301 and S306 are the same as steps S301 and S306 in the flowchart of FIG. 8 in the third embodiment. Accordingly, descriptions that overlap the descriptions in the first through third embodiments are essentially omitted, and operations in steps S101, S201, S301, S402, S106, S206, S306 and S407 are described below.

In step S101, the terminal communication state monitoring section 106 detects whether or not the terminal communication state of the information communication terminal apparatus 450 indicates the state of being inside the service area. When the terminal communication state indicates the state of being inside the service area, the processing proceeds to step S201. On the other hand, when it is detected that the terminal communication state indicates the state of being not inside the service area (being outside the service area), the processing proceeds to step S402.

In step S201, the server communication state monitoring section 206 detects whether or not the communication section 101 has received an error response from a communication partner server that has received a communication request from an application of the information communication terminal apparatus 450. When the communication section 101 has not received the error response from the communication partner server, the processing proceeds to step S301. On the other hand, when the communication section 101 has received the error response from the communication partner server, the processing proceeds to step S402.

In step S301, the communication response monitoring section 306 detects whether or not the communication section 101 has received a completion response from the communication partner server within a predetermined period by inquiring of the app. execution control section 103. When the communication section 101 has received the completion response from the communication partner server within the predetermined period, the processing returns to step S101. On the other hand, when the communication section 101 has not received the completion response from the communication partner server within the predetermined period, the processing proceeds to step S402.

Here, when the processing in steps S101, S201 and S301 are repeatedly performed, the communication processing of the application A being set with the focus is continued without problems, so that the processing of the application A is normally continued. On the other hand, when the processing proceeds to step S402 from any one of steps S101, S201 and S301, this means that the communication processing of the application A being set with the focus is interrupted (or has failed to start), so that processing of the application A is also interrupted.

In step S402, the app. execution control section 103 recognizes that the communication processing of the application A being set with the focus is interrupted (or has failed to start), and updates the app. communication state data of the application A to "waiting for communication recovery". Further, in step S402, the communication monitoring section 105 notifies the focus shift determination section 108 of the "interruption information".

In step S106, the terminal communication state monitoring section 106 detects whether or not the terminal communication state of the information communication terminal apparatus 450 has recovered to inside the service area. When it is not detected that the terminal communication state has recovered to inside the service area, the operation of step S106 is repeatedly performed. On the other hand, when it is detected that the terminal communication state has recovered to inside the service area, the processing proceeds to step S206.

In step S206, the server communication state monitoring section 206 detects whether or not the communication partner server has recovered to the state of being communicable. When it is not detected that the communication partner server has recovered to the state of being communicable (i.e., when the error response to the dummy communication request is received), the processing returns to step S106. On the other hand, when it is detected that the communication partner server has recovered to the state of being communicable (i.e., when the error response to the dummy communication request is not received), the processing proceeds to step S306.

In step S306, the communication response monitoring section 306 detects whether or not the completion response from the communication partner server has been received. When it is not detected that the completion response from the communication partner server has been received, the processing returns to step S106. On the other hand, when it is detected that the completion response from the communication partner server has been received, the processing proceeds to step S407.

In any one of the above-described steps S106, S206 and S306, when the processing returns to step S106 depending on the determination of "No", the state of the application B of being set with the focus is maintained since it is impossible to resume the processing of the application A, which is being released from the focus. On the other hand, when the processing proceeds from step S306 to step S407, the communication processing of the application A, which is being released from the focus, can be resumed.

In step S407, the communication monitoring section 105 notifies the focus shift determination section 108 of the "recovery information".

Note that when the determination in step S108 is "No", the processing returns to step S106.

As described above, when the communication processing of an application being set with the focus becomes inoperative, and the processing of the application is interrupted (or has failed to start), the automatic focus shift apparatus 400 according to the fourth embodiment can automatically shift the focus to the other application which can perform processing. Note that the reasons for the communication processing of the application being set with the focus to become inoperative are, for example, as previously described, that the information communication terminal apparatus 450 is located outside the service area, the communication partner server is not in the state of being communicable due to deterioration of the communication environment or the like of the communication partner server, and the application of the communication partner server is not normally operating due to an overloaded state or the like of the communication partner server. Further, when the communication processing of the previous application, from which the focus has been shifted to the other application, recovers, the automatic focus shift apparatus 400 according to the fourth embodiment can automatically return (shift) the focus to the previous application again.

In addition, in the automatic focus shift apparatus 400 according to the fourth embodiment, the communication monitoring section 105 can always monitor the communication processing of the application. Because of this, even when an application, whose usage frequency of the communication function varies, is executed, the focus can be shifted timely and promptly.

Accordingly, when the application that the user is operating becomes temporarily inoperative, the automatic focus shift apparatus 400 according to the fourth embodiment allows the user, without any particular input operation, to automatically start the operation of the other operable application. Further, when the communication processing of the application which has been inoperative recovers, the automatic focus shift apparatus 400 according to the fourth embodiment allows the user, without any particular input operation, to automatically resume the operation of the application that has been inoperative. As a result, operability of the information communication terminal apparatus 450 including the automatic focus shift apparatus 400 is enhanced, and utilization efficiency of the application executed by the information communication terminal apparatus 450 is also enhanced.

Note that in the above-described first through fourth embodiments, the focus shift determination section 108 determines to shift the focus, in step S103 of FIG. 4 and FIG. 10, to the application (application B), which is in the sate of "not performing communication processing" with reference to the state data. This is because the application (application B) "not performing communication processing" can perform processing. However, in addition, the focus shift determination section 108 may determine in step S103 (see FIG. 6) of the fourth embodiment to shift the focus to even an application in the state of "performing communication processing" in the case where the application performs communication processing with a server other than the communication partner server which has transmitted the error response and which does not transmit the completion response within the predetermined period. This is because, in such a case, the application to which the focus has been shifted can perform processing. Note that, in such a case, information specifying the communication partner server is attached to data that indicates "performing communication processing" (see FIG. 3) among the state data stored in the state data storage section 104, and the app. execution control section 103 also updates the information specifying the communication partner server.

Further, in the fourth embodiment, the communication monitoring section 105 included in the automatic focus shift apparatus 400 includes the terminal communication state monitoring section 106, the server communication state monitoring section 206, and the communication response monitoring section 306. However, the communication monitoring section 105 included in the automatic focus shift apparatus 400 may include any two among the terminal communication state monitoring section 106, the server communication state monitoring section 206, and the communication response monitoring section 306.

Further, in the first through fourth embodiments, the focus shift determination section 108 determines the shift of the focus, in steps S103 and S108 of FIGS. 4, 6, 8, and 10, in consideration of the "focus releasable/unreleasable state data". However, in steps S103 and S108 of FIGS. 4, 6, 8, and 10, the focus shift determination section 108 may determine the shift of the focus without taking the "focus releasable/unreleasable state data" into consideration.

Furthermore, in the first through fourth embodiments, the cases are described as examples with reference to FIGS. 4, 6, 8, and 10 where two applications A and B are executed concurrently, and app. windows corresponding to the respective applications are displayed concurrently on the display section 102. However, even in the case where three or more applications are executed concurrently, and app. windows corresponding to the respective applications are displayed concurrently on the display section 102, the processing illustrated in FIGS. 4, 6, 8, and 10 can be performed. In such a case, the state data stored in the state data storage section 104 further includes "priority data" indicating priority order, and in step S103 of FIGS. 4, 6, 8 and 10, the focus shift determination section 108 may preferentially shift the focus to an application with a higher priority.

For example, the priority order set for an application becomes higher in accordance with an increase in frequency of shifting the focus to the application from an application originally with the focus. In such a case, the app. execution control section 103 accumulates therein a shift history of the focus, for example, and updates, based on the shift history, the "priority data" in the state data storage section 104.

In addition, for example, the priority order set for an application becomes higher in accordance with an increase in association between the application and an application originally with the focus. In such a case, for example, the app. execution control section 103 searches for a keyword, or the like, which each of the applications has, and determines that the higher the similarity, of the keyword or the like of an application, with the keyword or the like of an application originally with the focus, the stronger the association between the application and the application A. Then, the app. execution control section 103 updates the "priority data" in the state data storage section 104 based on the determination result.

Further, for example, the priority order of an application to which the focus has been most recently shifted from the application originally with the focus, may be set to be highest. In such a case, the app. execution control section 103 accumulates therein a shift history of the focus, for example, and updates, based on the shift history, the "priority data" in the state data storage section 104.

Furthermore, the priority order may be set by a user, for example. In such a case, the user sets the "priority data" in the state data storage section 104 by using an input section (not shown).

The present invention is applicable to an information communication terminal apparatus or the like which displays a plurality of application windows at the same time, and especially useful, for example, when it is desired to automatically shift the focus of a window.

The invention claimed is:

1. An automatic focus shift apparatus for an information communication terminal apparatus configured to concurrently display a plurality of application windows on a display section and performing communication with another apparatus by using a communication section, the display section being configured to display one window with focus as an operation target of a user among the plurality of windows currently being displayed, the automatic focus shift apparatus comprising:

a state data storage section configured to store data indicating an execution state of each application as state data, the execution state for each application being based on focus state data, application communication state data and focus releasable/unreleasable state data;

a communication monitoring section configured to detect an interruption of communication processing started by an application corresponding to a first window displayed with the focus, and output interruption information;

a focus shift determination section configured to determine, when the interruption information from the communication monitoring section is inputted, a second window to which the focus is to shift is based on the execution state of each application;

an application execution control section configured to control application execution processing for, at least, applications respectively corresponding to the plurality of windows being currently displayed on the display section; and a focus control section configured to instruct the application execution control section to shift the focus in accordance with the determination by the focus shift determination section, wherein the application execution control section is configured to cause, in accordance with the instruction by the focus control section, the focus to shift from the first window displayed on the display section to the second window, wherein the application communication state data indicates that each application is either in a state of currently performing communication processing or in a state of not performing communication processing, wherein the focus releasable/unreleasable state data indicates whether or not each application is in a state of allowing the focus on a corresponding window to be released to shift to another application window, and wherein the focus shift determination section determines, when the interruption information from the communication monitoring section is inputted, on condition that the focus releasable/unreleasable state data of the application corresponding to the first window indicates the state of allowing the focus to shift to another application window, a window of an application having the application communication state data indicating the state of not performing the communication processing, to be the second window to which the focus is to shift.

2. The automatic focus shift apparatus according to claim 1, wherein the communication monitoring section is further configured to detect recovery of interrupted communication processing, and output recovery information;

the focus shift determination section is further configured to determine, based on the state data, when the recovery information from the communication monitoring section is inputted, whether or not to cause the focus to return from the second window to the first window;

the focus control section is further configured to instruct the application execution control section, when the focus shift determination section determines to cause the focus to return from the second window to the first window, to return the focus in accordance with the determination by the focus shift determination section; and the application execution control section is further configured to cause the focus to return, in accordance with the instruction by the focus control section, from the second window displayed on the display section to the first window.

3. The automatic focus shift apparatus according to claim 2, wherein when detecting that the information communication terminal apparatus is not located inside a service area, the communication monitoring section determines to have detected the interruption of the communication processing and outputs the interruption information, and when detecting that the information communication terminal apparatus is located inside the service area, the communication monitoring section determines to have detected the recovery of the interrupted communication processing and outputs the recovery information.

4. The automatic focus shift apparatus according to claim 2, wherein when detecting a communication error response transmitted from a partner apparatus of the communication processing, the communication monitoring section determines to have detected the interruption of the communication processing and outputs the interruption information, and when not detecting the communication error response to dummy communication which is periodically performed by the communication section with the partner apparatus of the communication, the communication monitoring section determines to have detected the recovery of the interrupted communication processing and outputs the recovery information.

5. The automatic focus shift apparatus according to claim 2, wherein when not detecting, within a predetermined period, a completion response transmitted from a partner apparatus of the communication processing, the communication monitoring section determines to have detected the interruption of the communication processing and outputs the interruption information, and when detecting the completion response transmitted from the partner apparatus of the communication processing, the communication monitoring section determines to have detected the recovery of the interrupted communication processing and outputs the recovery information.

6. The automatic focus shift apparatus according to claim 2, wherein the application communication state data indicates that each application is in one of the state of currently performing communication processing, the state of not performing communication processing, and a state of waiting for communication recovery, and the focus shift determination section further determines, when the recovery information from the communication monitoring section is inputted, on condition that the focus releasable/unreleasable state data of the application corresponding to the second window indicates the state of allowing the focus to shift to another application window, and on condition that the application communication state data of the application corresponding to the first window indicates the state of waiting for communication recovery, to cause the focus to return from the second window to the first window.

7. The automatic focus shift apparatus according to claim 1, wherein the application execution control section is further configured to update, using a latest execution state of each application, the state data stored in the state data storage section.

8. The automatic focus shift apparatus according to claim 1, wherein when detecting that the information communication terminal apparatus is not located inside a service area, the communication monitoring section determines to have detected the interruption of the communication processing and outputs the interruption information.

9. The automatic focus shift apparatus according to claim 1, wherein when detecting a communication error response transmitted from a partner apparatus of the communication processing, the communication monitoring section determines to have detected the interruption of the communication processing and outputs the interruption information.

10. The automatic focus shift apparatus according to claim 1, wherein when not detecting, within a predetermined period, a completion response transmitted from a partner apparatus of the communication processing, the communication monitoring section determines to have detected the interruption of the communication processing and outputs the interruption information.

11. A method used by an automatic focus shift apparatus included in an information communication terminal apparatus which concurrently displays a plurality of application windows on a display section and which performs communication with another apparatus by using a communication section, the display section displaying one window with focus as an operation target of a user among the plurality of windows currently being displayed, and the automatic focus shift apparatus storing data indicating an execution state of each application as state data, the execution state for each application being based on focus state data, application communication state data and focus releasable/unreleasable state data;

the method used by the automatic focus shift apparatus comprising:

communication monitoring including detecting an interruption of communication processing started by an application corresponding to a first window displayed with the focus, and generating interruption information;

focus shift determining including, when the interruption information is generated in the communication monitoring step, determining a second window to which the focus is to shift, based on the execution state of each application; and focus shifting including shifting the focus, in accordance with the determination in the focus shift determining step, from the first window displayed on the display section to the second window, wherein the application communication state data indicates that each application is either in a state of currently performing communication processing or in a state of not performing communication processing, wherein the focus releasable/unreleasable state data indicates whether or not each application is in a state of allowing the focus on a corresponding window to be released to shift to another application window, and the focus shift determining step includes determining, when the interruption information is generated in the communication monitoring step, on condition that the focus releasable/unreleasable state data of the application corresponding to the first window indicates the state of allowing the focus to shift to another application window, a window of an application having the application communication state data indicating the state of not performing the communication processing, to be the second window to which the focus is to shift.

* * * * *